UNITED STATES PATENT OFFICE.

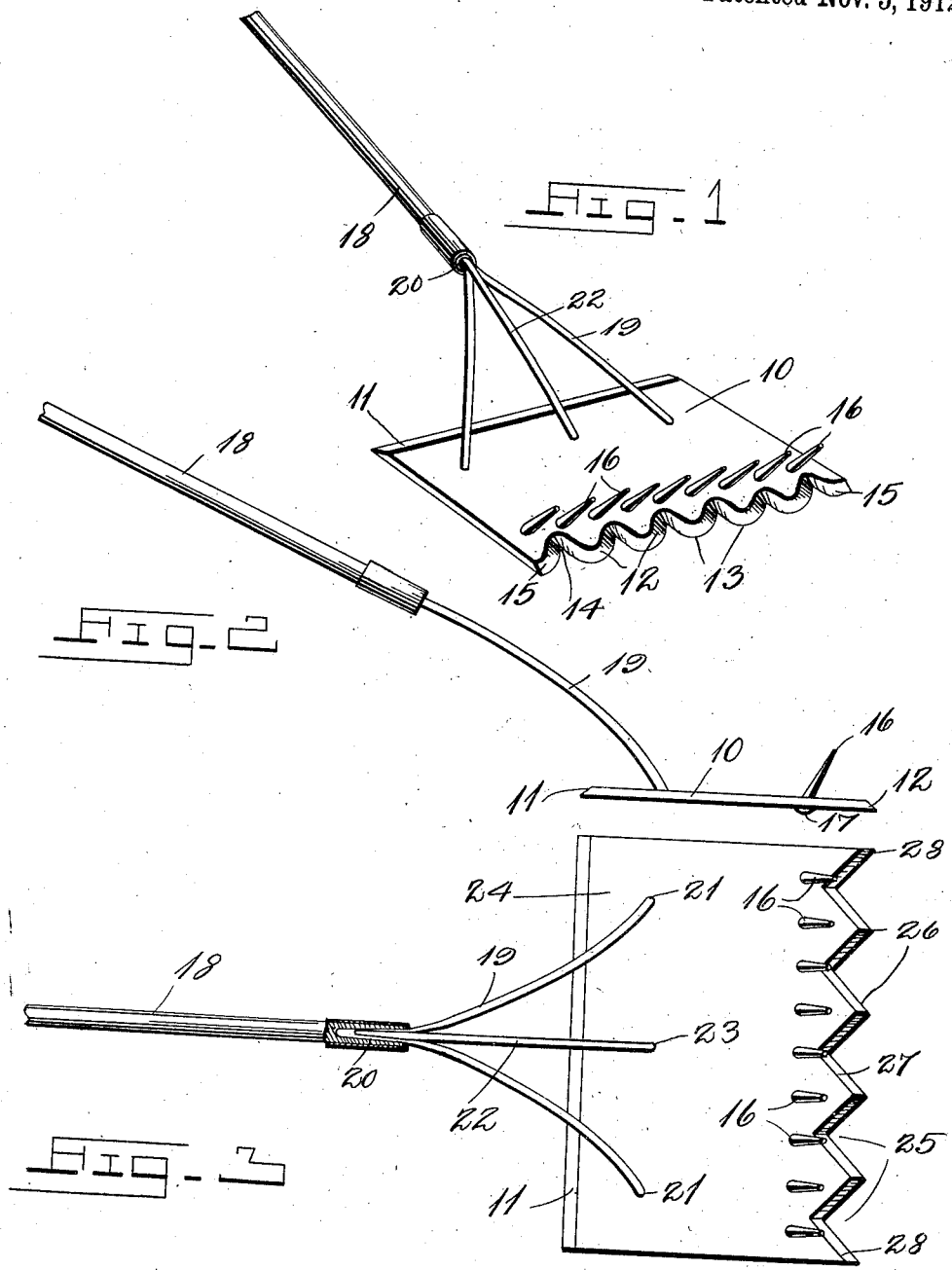

FLORIS FERWERDA, OF MILLSTONE, NEW JERSEY.

COMBINED SCRAPER, HOE, AND RAKE.

1,043,758.   Specification of Letters Patent.   Patented Nov. 5, 1912.

Application filed February 14, 1912. Serial No. 677,523.

*To all whom it may concern:*

Be it known that I, FLORIS FERWERDA, a citizen of the United States, residing at Millstone, in the county of Somerset, State of New Jersey, have invented certain new and useful Improvements in Combined Scrapers, Hoes, and Rakes; and I do hereby declare the following to be a full, clear, and exact description of the invention, such as will enable others skilled in the art to which it appertains to make and use the same.

This invention has particular reference to a combined scraper, hoe and rake.

The primary object of the invention is to provide an implement of this character which will serve as a convenience to the gardener in cultivating growing plants and in which the desired implement will always be at hand.

Another and important object of the invention is the provision of a combination scraper, hoe and rake, which comprises a blade or plate member having its straight edge forming a hoe and a toothed or scalloped edge which will attack weeds and the like sidewise thus rendering cutting easier and with a series of rake teeth secured to the blade and extended forwardly toward the toothed or scalloped edge to serve for convenient use without interference by the said edge.

With the above and other objects in view, the invention consists of certain combinations and arrangement of parts which will be hereinafter more fully described, claimed and illustrated in the accompanying drawings, in which—

Figure 1 is a perspective view of the preferred form of combined scraper, hoe and rake. Fig. 2 is a side elevation thereof. Fig. 3 is a plan view of another form of the invention.

Referring more specifically to the drawings, in which like characters of reference designate similar parts throughout the several views, 10 designates the plate or blade of the implement which has its rear edge formed with a beveled cutting edge 11 adapted for use as a hoe and which has its forward edge beveled as shown at 12 and provided with a series of scalloped projections or cutting portions 13 providing intervening notches 14 and having the end portions or scallops 15 substantially half the length of the scalloped portions 13 so that their forward edges are located on the line coincident with the forward edges of the remaining portions.

The implement is especially adapted for garden use, as for instance in weeding and cultivating growing plants, the hoe edge 11 forming a cutting member while owing to the particular formation of the scraper edge in the form of scalloped portions, when the device is in use the gliding motion thus produced will attack the weeds and hard knots or other obstructions from the side or at an angle and thus render the cutting much easier.

The blade 10 may be of any preferred size as may be found desirable.

The blade 10 is formed of hardened steel and in order to provide a rake, a plurality of teeth 16 of suitable material and length have their end portions riveted or otherwise secured through the blade as shown at 17 along a line parallel to the forward edges of the scalloped portions 13 and at a point adjacent thereto. These teeth project forwardly toward said scalloped portions in an inclined position from the plate when in use. With this construction either the scalloped edges 13 may be used as a scraper or the teeth used separately without one interfering with the other.

A handle 18 is suitably secured to the blade 10 and for this purpose a shank member 19 is provided, the same comprising a single section of metal bent intermediately of its ends to provide a shank portion proper 20 which is secured in one end of the handle and which has its free ends secured to the blade as shown at 21 near the opposite side edges and the rear edge 11 as shown. The said parts are further secured together by a central shank member 22 which is secured to the blade as shown at 23 centrally between the securing portions 21 and also secured to the handle between the rebent portions of the member 19 thereby rigidly holding the blade to the handle. It will also be observed that the handle 18 is secured to the blade in an inclined direction opposite to the inclination of the teeth 16 whereby when the device is in use the rear cutting edge 11 may be used by a rearward pull upon the handle while the scalloped portions 13 may be used by a forward thrust and by simply inverting the position of the blade, the teeth 16 may be used as a rake.

In Fig. 3 of the drawings a blade 24 is employed in lieu of the blade 10 and the same construction except that its forward edge is provided with V-shaped notches 25 producing tooth cutting edges 26 which are beveled as shown at 27 for use as a scraper. The outer tooth portions 28 are also terminated at a line coincident with the apex of one of the tooth portions on a line connecting the forward extremities of the teeth.

It will thus be seen that I have provided a very simple and an improved form of combination implement embodying a scraper, hoe and rake which will be very desirable in use for reason of the fact that the implement will be conveniently at hand and will not necessitate the inconvenience of going back over a field after having weeded or cultivated a row of plants in order to get the required implement as is generally done.

Having thus fully described my invention what I claim is:

An implement comprising a blade formed at one edge with a plurality of beveled notched portions forming a scraper, rake teeth secured to the blade adjacent to the projections and on a line parallel to the forward edges, said teeth being inclined toward said projections and a handle secured to the blade adjacent the opposite edge.

In testimony whereof, I affix my signature, in presence of two witnesses.

FLORIS FERWERDA.

Witnesses:
MARY E. COLE,
ELIZABETH B. COLE.